Patented Jan. 26, 1932

1,842,394

UNITED STATES PATENT OFFICE

HERBERT A. ENDRES, OF LOMPOC, CALIFORNIA, ASSIGNOR, BY MESNE ASSIGNMENTS, TO CELITE CORPORATION, OF NEW YORK, N. Y., A CORPORATION OF NEW YORK

COMPOSITION OF MATTER AND PROCESS OF MAKING THE SAME

No Drawing. Application filed February 7, 1928. Serial No. 252,678.

This invention relates to an improved product especially adapted for use as a compounding material in the production of rubber; and to the method of producing such product and to the rubber composition produced by use of such product. The novel product consists of a finely divided silicious material of amorphous structure in which the free lime has been neutralized by sulphur dioxide and which contains a substantial amount of sulfur dioxide adsorbed or absorbed by, or otherwise combined with, the silicate, as evidenced by a substantial increase in the weight of the silicate during its treatment with the sulfur dioxide. Such novel product is very useful as a compounding ingredient in the manufacture of rubber and has the very useful properties of increasing the strength of the rubber without having undesirable vulcanization accelerating properties.

My novel product in brief consists of a silicate preferably made from diatomaceous silica, according to the method disclosed in my U. S. Patent 1,574,380 of February 23, 1926, and exposed, preferably when substantially dry, to the action of sulfur dioxide gas ($SO_2$).

My said patent discloses various methods of producing a very finely divided silicious material based upon the discovery that when a water suspension of a finely ground or powdered silica is treated with lime, at temperatures near the boiling point, at atmospheric or an elevated pressure, as for example, at 15 pounds gage pressure per square inch, a rapid reaction takes place, whereby a voluminous, almost gelatinous mass of hydrated mono-calcium silicate is produced. The reaction product of the lime solution and diatomaceous earth is then dried, preferably by calcining it in a rotary kiln at a temperature of about 1000° F. for twenty to thirty minutes. The material produced by this process is a powder of an extremely fine state of division. Such material is a good "filler" for rubber but has a tendency to produce undesirable acceleration of the vulcanization unless used very carefully.

The term "lime-reacted and disruptively dried siliceous product", as used in the present specifications and claims, means any material produced as described in my said patent, by reacting finely divided silica with lime, dewatering, and then disruptively drying, as by calcination of the wet product.

One of the objects of my present invention is to improve the said patented product so that when used as a "filler" the undesirable acceleration of vulcanization would be avoided, and its rubber strengthening properties would be enhanced. I have discovered that said patented filler may be thus improved by exposing it, preferably while substantially dry, to the action of gaseous sulphur dioxide ($SO_2$) by the use of any suitable apparatus. In carrying out this part of my invention I pass sulfur dioxide gas through a mass of said finely divided silicate powder until the weight of the powder is increased by its adsorption, absorption, or combination with, the sulfur dioxide gas from ½% up to 10% by weight. In this process the sulfur dioxide first neutralizes all the free lime that might exist in the silicate powder, which is usually less than one per cent. The product obtained by treating the finely divided silicate with gaseous sulfur dioxide, as above described, when used as a compounding ingredient for rubber not only increases the strength of the vulcanized rubber, but also slows down or retards the vulcanization thereof as compared with the action of the silicious powder set forth in my aforesaid patent.

The beneficial effect of the sulphur dioxide treatment is shown by the increased strength given the vulcanized rubber, and by the slowing down of the rate of vulcanization when such $SO_2$ treated material is used, and the resultant minimizing of the danger of overvulcanizing the rubber. The chemical explanation of these facts is probably to be found in the neutralizing action of the sulfur dioxide on the small amount of free lime contained in the calcium silicate and by the sulfur dioxide content of my product as hereinafter referred to, I intend to include either combined or free sulfur dioxide. It is essential that when an excess of $SO_2$ is used, the material should be substantially dry while being sulfured, otherwise the excess amount of $SO_2$ would produce an undesirably high amount of calcium sulfite by decomposing the calcium silicate.

My product however may be made from wet material by properly limiting the amount of $SO_2$ to that which will neutralize the free lime in the product. By "wet material" I refer to the product resulting from the treatment of diatomaceous silica with lime, before it is dried or calcined.

The following figures show the increase in strength of rubber and retardation of time in curing results from the use of my sulfured filler, and also show comparative results of same process using untreated filler material such as described in my said patent:

| Time of cure minutes at 287° F. | With 15 volumes untreated filler per 100 volumes of rubber—tensile strength at break, lbs. per sq. in. | % elongation at break | With 15 volumes sulfured filler per 100 volumes of rubber—tensile strength at break, lbs. per sq. in. | % elongation at break |
|---|---|---|---|---|
| 20 | 3410 | 610 | 3580 | 615 |
| 30 | 3300 | 600 | 3530 | 615 |
| 40 | 3150 | 600 | 3410 | 635 |
| 50 | 2825 | 600 | 3150 | 630 |
| 60 | 2700 | 590 | 3210 | 640 |

Similar amounts of di-phenylguanidine were used as an accelerator in each of the above tests. The sulfured filler used in these trials and produced in accordance with my invention had adsorbed, absorbed, or combined with, 4.23% of sulfur dioxide ($SO_2$).

While I have described the treatment of a finely divided calcium silicate, made from diatomaceous silica and lime, with sulfur dioxide, my invention also includes the corresponding treatment of silicates made from other alkaline-earth metal hydroxide which is at least as soluble in water as calcium hydroxide, namely barium or strontium hydroxide, although the use of barium or strontium hydroxide is not desirable economically at the present time.

In making rubber compositions with my novel compounding ingredient, I may use from one volume to thirty volumes of such compounding ingredient to 100 volumes of raw rubber and proper proportions of suitable vulcanizing agents.

I claim:

1. As a composition of matter a finely divided silicate of an alkaline-earth metal whose hydroxide is at least as soluble in water as calcium hydroxide, said silicate containing a substantial percentage of sulfur dioxide.

2. As a composition of matter lime-reacted and disruptively dried siliceous product impregnated with sulfur dioxide gas.

3. As a composition of matter a lime-reacted and disruptively dried siliceous product containing from about one-half to 10% of sulfur dioxide.

4. As a composition of matter, a lime-reacted and disruptively dried siliceous product in which the free lime has been neutralized by sulfur dioxide gas and containing a substantial percentage of sulfur dioxide.

5. The method of preparing a composition comprising calcium silicate which comprises reacting lime, water and diatomaceous silica by applying heat, and exposing the reaction product to sulfur dioxide gas until the free lime is neutralized.

6. The method of preparing a composition comprising a calcium silicate which comprises heating diatomaceous earth with lime and water at a temperature near the boiling point at an elevated pressure until complete conversion to gelatinous calcium silicate takes place, drying the reaction product, and then passing sulfur dioxide through the substantially dry powder until the original weight of the latter is substantially increased.

7. The method of preparing a composition comprising calcium silicate which comprises reacting lime, water and diatomaceous silica by applying heat, dewatering and then calcining the gelatinous wet product whereby disruptive drying is effected, and exposing the finely divided dry product to sulfur dioxide gas for a substantial length of time.

8. The method of preparing a composition comprising a calcium silicate which comprises heating diatomaceous earth with lime and water until complete conversion to gelatinous calcium silicate takes place, dewatering and then calcining the gelatinous wet product whereby disruptive drying is effected, and then passing sulfur dioxide through the substantially dry powder until the original weight of the latter is substantially increased.

9. The new composition of matter resulting from reacting diatomaceous earth with an alkaline earth hydroxide which is at least as soluble in water as calcium hydroxide, disruptively drying and subsequently treating the reaction product with sulfur dioxide.

10. The herein described process for producing a new composition of matter; consisting in first reacting diatomaceous earth with an alkaline earth hydroxide which is at least as soluble in water as calcium hydroxide, disruptively drying, and subsequently treating the reaction product with sulfur dioxide.

HERBERT A. ENDRES.